(12) United States Patent
Kim

(10) Patent No.: US 8,140,955 B2
(45) Date of Patent: Mar. 20, 2012

(54) IMAGE COMMUNICATION PORTABLE TERMINAL AND METHOD FOR CARRYING OUT IMAGE COMMUNICATION USING THE SAME

(75) Inventor: Bong-Jung Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 883 days.

(21) Appl. No.: 11/708,693

(22) Filed: Feb. 20, 2007

(65) Prior Publication Data

US 2007/0211299 A1 Sep. 13, 2007

(30) Foreign Application Priority Data

Feb. 17, 2006 (KR) .................. 10-2006-0015858

(51) Int. Cl.
*G06F 17/00* (2006.01)

(52) U.S. Cl. ....................................... 715/203

(58) Field of Classification Search .......... 715/201, 715/202, 203
See application file for complete search history.

(56) References Cited

U.S. PATENT DOCUMENTS

| | | | | |
|---|---|---|---|---|
| 6,791,620 B1* | 9/2004 | Elswick et al. | ............... | 348/441 |
| 7,016,596 B2* | 3/2006 | Itoh | ............................... | 386/243 |
| 7,394,485 B2* | 7/2008 | Kim | .......................... | 348/220.1 |
| 2003/0081127 A1* | 5/2003 | Kirmuss | .................. | 348/207.99 |
| 2003/0081935 A1* | 5/2003 | Kirmuss | .......................... | 386/46 |
| 2003/0110926 A1* | 6/2003 | Sitrick et al. | ................. | 84/477 R |
| 2005/0210393 A1* | 9/2005 | Maeng | .......................... | 715/751 |
| 2006/0195787 A1* | 8/2006 | Topiwala et al. | ............. | 715/700 |
| 2007/0067485 A1* | 3/2007 | Stotland et al. | ............... | 709/232 |

* cited by examiner

*Primary Examiner* — Laurie Ries
(74) *Attorney, Agent, or Firm* — The Farrell Law Firm, P.C.

(57) ABSTRACT

Disclosed are an image communication portable terminal and a method for carrying out an image communication using an image communication portable terminal. The image communication portable terminal includes a memory for storing a large amount of image and sound data which are combined with video and audio data to be input during image communication; and a controller for combining current video or audio data with specific image or sound data among the image or sound data stored in advance depending on data combination requirement during the image communication, and encoding and transmitting the combined data into an image communication data format. Accordingly, it is possible to dynamically express video data and audio data during the image communication, thereby increasing the user's satisfaction with the image communication.

7 Claims, 4 Drawing Sheets

IMAGE COMMUNICATION PORTABLE TERMINAL AND METHOD FOR CARRYING OUT IMAGE COMMUNICATION USING THE SAME

PRIORITY

This application claims priority to application entitled "Image Communication Portable Terminal And Method For Carrying Out Image Communication Using The Same" filed with the Korean Intellectual Property Office on Feb. 17, 2006 and assigned Serial No. 2006-15858, the contents of which are incorporated herein by reference.

BACKGROUND OF THE INVENTION

1. Field of the Invention

The present invention relates to an image communication portable terminal, more particularly to a method for carrying out image communication using an image communication portable terminal.

2. Description of the Related Art

Image communication portable terminals refer to portable terminals which provide an image communication service using a photographing function as well as a voice communication service which is provided by common portable communication terminals.

Generally, the image communication portable terminal includes a camera for capturing a subject's picture, the camera being fixed to the body of the portable terminal, a video processor for receiving image information from the camera and to convert and compress the image into digital signals when the camera photographs the subject, and a Radio Frequency (RF) unit for wirelessly transmitting the converted and compressed signals.

In the conventional image communication portable terminal, a user inputs the recipient's phone number using the keypad of the portable terminal and then pushes a send key (or transmission key) intending to access a recipient portable terminal in order to communicate with him/her. When the users' portable terminal connects to the recipient portable terminal, the users' portable terminal obtains information on the users' image and voice through a camera and a microphone and transmits the obtained image and voice information, so that the transmitter's image information is displayed on the screen of the recipient portable terminal.

Conversely, image information transmitted from the recipient portable terminal is displayed on the screen of the transmitter portable terminal. Thus, the user can carry out image communication with his/her partner while viewing the recipient's image information and listening to the recipient's voice.

The conventional image communication portable terminal as described above transmits only video data input from the camera and audio data input from the microphone to the recipient portable terminal during the image communication. Further, the conventional image communication portable terminal continuously transmits only predetermined video data or audio data.

Recently, with development in image communication technologies and an increasing number of users, the trend has been to carry out more dynamic and expressive image communication. However, in the conventional image communication method, the image communication portable terminal merely transmits the input video/audio data, or the predetermined video/audio data. Therefore, there is a problem in that the conventional image communication method cannot satisfy users' demands.

SUMMARY OF THE INVENTION

Accordingly, the present invention has been made to solve the above-mentioned problems occurring in the prior art, and it is an object of the present invention to provide an image communication portable terminal for providing dynamic and expressive images and a method for carrying out image communication using the same.

It is another object of the present invention to provide an image communication portable terminal for compounding video/audio data input with already stored image/sound data and transmitting the combined images during image communication, thereby fulfilling the user's desire.

In order to accomplish these objects of the present invention, there is provided an image communication portable terminal, which includes a memory for storing a large amount of image and sound data to be combined with video data and audio data input during image communication; and a controller for combining current video data or audio data with specific data among the image or sound data stored in advance depending on data combination and transmission requirements during the image communication, and encoding and transmitting the combined data using an image communication data format.

In order to accomplish these objects of the present invention, according to another aspect of the present invention, there is provided a method for carrying out image communication using an image communication portable terminal, which includes receiving data combination requirements during image communication; reading specific image and sound data to be combined, among image data stored in advance when the data combination requirements is input; combining the read image or sound data with current video and audio data; and encoding and transmitting the combined data into an image communication data format.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Figure 1:
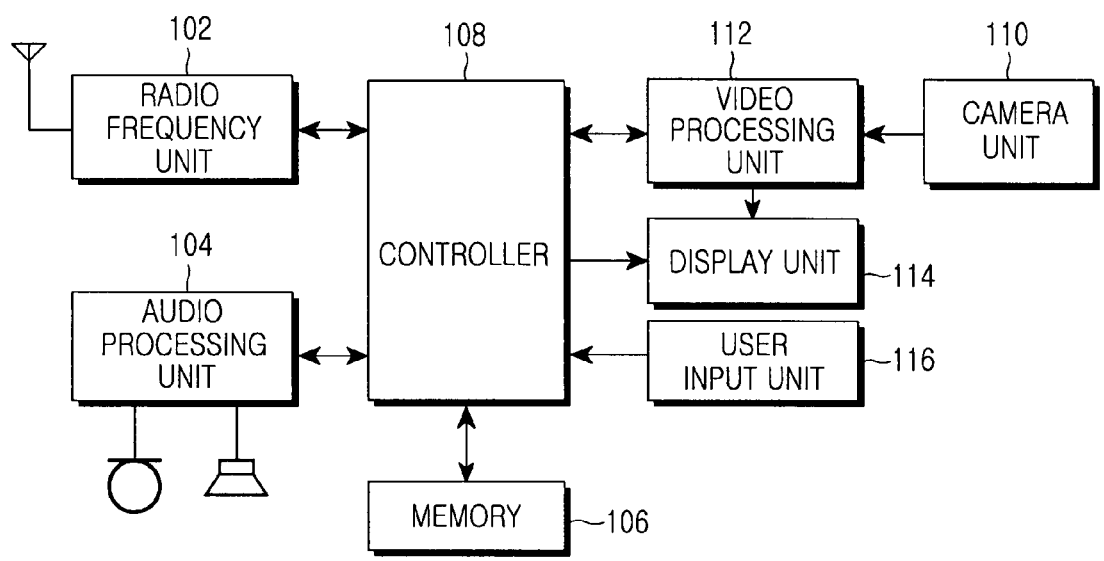
FIG. 1 is a block diagram of a typical image communication portable terminal according to the present invention.

Hereinafter, a preferred embodiment of the present invention will be described in detail with reference to the accompanying drawings. The same reference numerals denote the same reference elements throughout the drawings. In the following description, a detailed description of known functions and configurations incorporated herein is omitted to avoid making the subject matter of the present invention unclear.

Referring to FIG. 1, the image communication portable terminal according to the embodiment of the present invention includes a Radio Unit 102, an Audio Processing Unit 104, a Memory 106, a Controller 108, a Camera Unit 110, a Video Processing Unit 112, a Display Unit 114, and a User Input Unit 116.

The radio unit 102 which transmits and receives radio signals, and converts, amplifies, and up-converts digital signals into a baseband so as to transmit the converted digital signals through an antenna. Further, the radio unit 102 down-converts signals which are received through the antenna, and amplifies the converted signals so as to convert the signals into digital ones. Such a radio unit 102 outputs image communication signals which are received through the antenna to the controller 108, while wirelessly outputting the image communication signals which are received from the controller 108 to a base station through the antenna.

The audio processing unit 104 inputs and outputs audio signals during image communication and voice communication. Such an audio processing unit 104 demodulates and outputs digital audio signals as audible sound through speakers, and processes and output audio signals which are input through a microphone as digital signals.

The memory 106 stores programs and data to perform the various functions of the portable terminal. Further, the memory 106 stores predefined image and sound data to be synthesized with video data or audio data which are received by a user during image communication.

The controller 108 entirely controls the portable terminal, and carries out image communication according to a user's requirement. The controller 108 combines image data or sound data, which are stored in advance according to the user's data-combination requirement with current video data or audio data, respectively during the image communication.

The camera unit 110 converts optical signals of a subject photographed through lenses mounted on the camera 110 into electrical image signals, and then outputs the electrical signal to the video processing unit 112.

The video signal processing unit 112 processes video data during the image communication. Such a video signal processing unit 112 converts photographed input signals from the camera 110 into video signals which are digital signals, then compresses and encodes the video signals into video data. Next, the video signal processing unit 112 decodes the video data received from the controller 108, and then demodulates and outputs the compressed video signals.

The display unit 114 may include a Liquid Crystal Display (LCD), and displays data generated during the operation of the portable terminal under the control of the controller 108. Such a display unit 114 displays the video signals output from the video signal processing unit 112, on an image communication screen during the image communication.

The user's input unit 116 may include a keypad and a touch pad, etc., in which character keys, numeral keys, various function keys, and external volume keys are arranged. The user's input unit 116 outputs key input signals corresponding to keys input by the user to the controller 108. The user's input unit 116 has a data-combination requirement key used for combining predefined image data or sound data with currently input video data or audio data so as to transmit the combined video data and audio data during the image communication. The user's input unit 116 requests the combination of predefined image data or sound data depending on input keys when the user inputs the data combination requirement during the image communication.

Accordingly, the controller 108 combines the predefined image data or sound data with the currently input video or audio data, and then transmits the combined data during the image communication.

Figure 2:
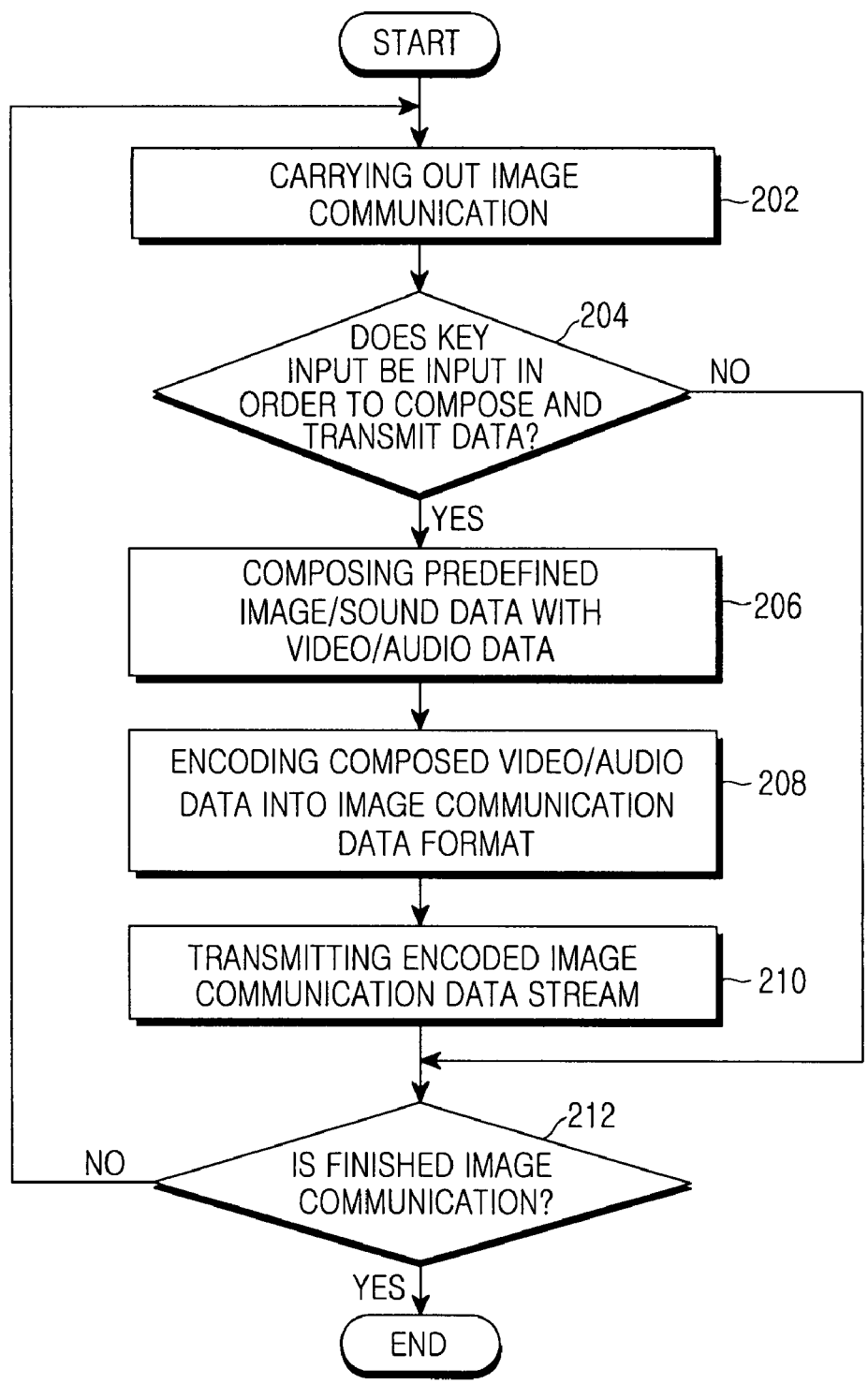
FIG. 2 is a flowchart illustrating a method for carrying out image communication using the image communication portable terminal according to the present invention.

Hereinafter, processes for carrying out the image communication by the controller 108 will be described in detail. FIG. 2 is a flowchart illustrating a method for carrying out image communication using the image communication portable terminal according to the present invention.

Referring to FIG. 2, the portable terminal carries out image communication according to a user's requirement at step 202. During the image communication, the portable terminal determines if there is a data combination requirement at step 204.

If the user inputs a data combination requirement, the portable terminal reads the image or sound data, from the image and sound data stored in the memory 106 at step 206 as requested. Then, the portable terminal combines the read image or sound data with the currently input video and audio data. At this time, the portable terminal combines the current input video data or audio data with the image data or sound data by the unit of a frame.

Figure 3A:
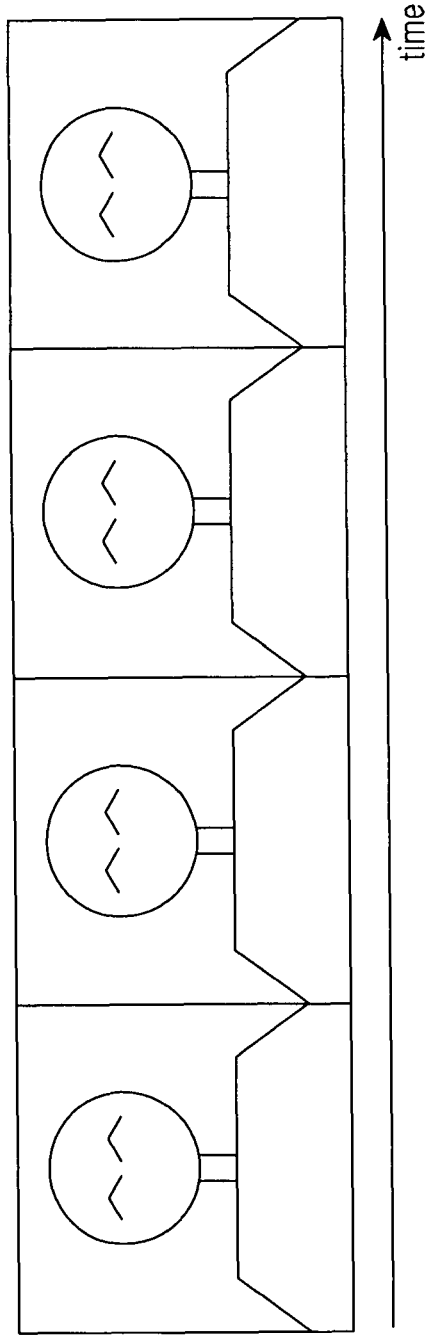
FIG. 3 is a view showing currently taken video data and already stored video data according to the present invention.
Figure 3B:
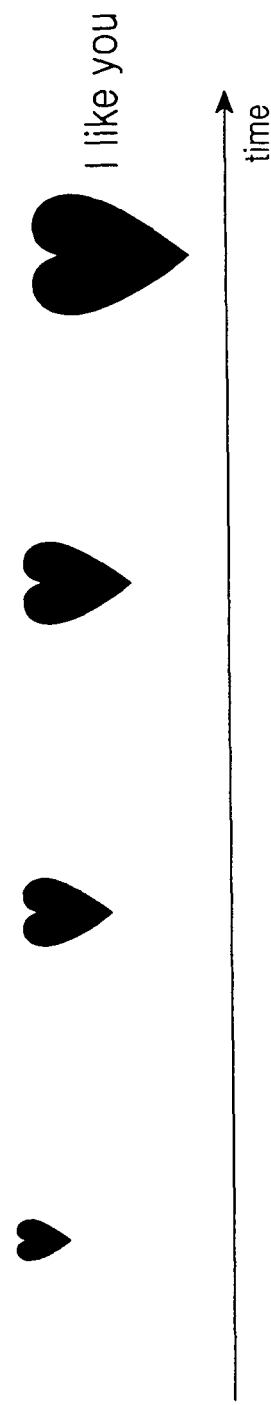

FIG. 3A shows the current input video data frame. FIG. 3B shows image data frames stored in advance. When the user inputs the data combination requirement while the current video data frames are input as shown in FIG. 3A, the portable terminal combines the predefined image data shown in FIG. 3B with the frames of FIG. 3A, respectively.

Figure 4:
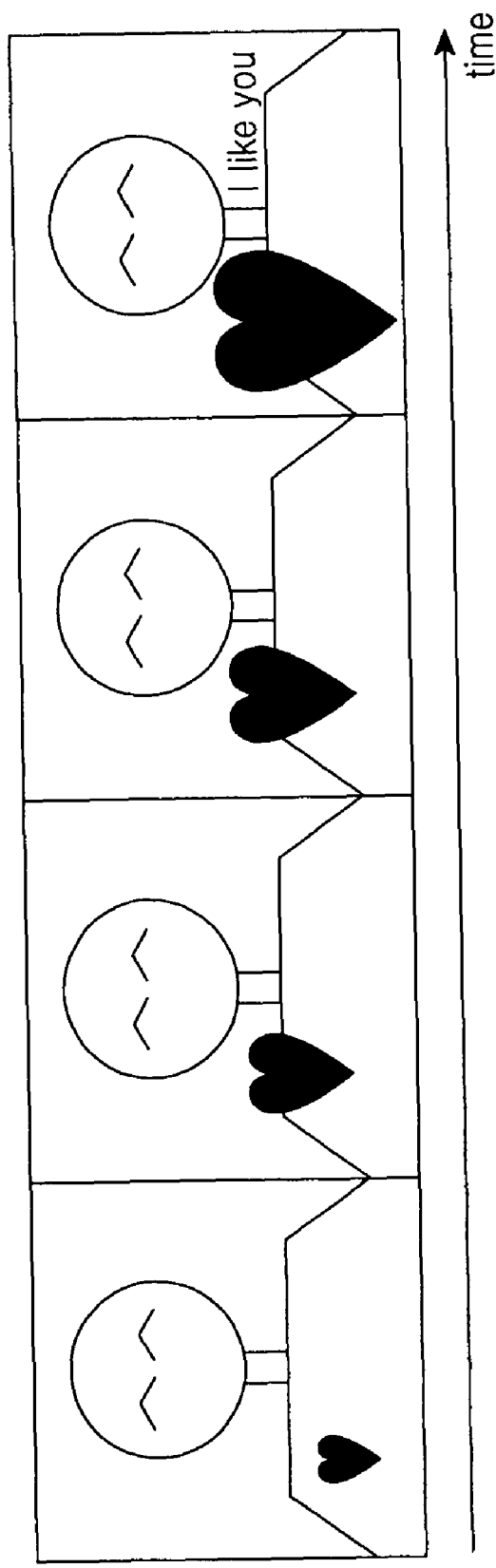
FIG. 4 is a view showing combined video data according to the present invention.

Referring to FIG. 4, if the current input video data frames are combined with the image data frames stored in advance, the current input video data can be expressed more dynamically, as shown in FIG. 4.

Although the video data combination has been described, it is understood that the audio data too can be combined.

As described above, when the video data or the audio data are combined, the portable terminal encodes the combined video and audio data in the predefined format in order to carry out image communication at step 208. At this time, the format defined to carry out the image communication includes MPEG4, and H.263, etc.

The portable terminal transmits the encoded image data stream to a recipient portable terminal at step 210.

Then, at step 212, the portable terminal determines if the image communication is finished. The portable terminal repeatedly performs steps 202 to 210 until the image communication is finished.

As described above, according to the present invention, the video and audio data can be dynamically and expressively output, so as to increase the satisfaction of the user with the image communication.

Further, the present invention allows the user to combine and transmit desired image/sound data with video/audio data during the image communication, thereby fulfilling the user's desire.

While the invention has been shown and described with reference to a certain preferred embodiment thereof, it will be understood by those skilled in the art that various changes in form and details may be made therein without departing from the spirit and scope of the invention as further defined by the appended claims.

What is claimed is:

1. An image communication portable terminal comprising:
a memory for storing a large amount of image data which is combined with video data to be input during an image communication; and
a controller for performing the image communication by continuously combining current video data currently received from an image capture device during the image communication with specific image data among the image data stored in advance, and continuously encoding and transmitting the continuously combined data as an image,
wherein combining the current video data with the specific image data among the image data stored in advance includes overlaying the specific image data stored in advance onto the current video data to create the combined data, and
wherein the combined data is encoded and transmitted during the image communication with a recipient portable terminal in real time.

2. The image communication portable terminal as claimed in claim 1, further comprising a user input unit, which transmits data combination requirement signals to the controller when a user pushes a data combination requirement key.

3. The image communication portable terminal as claimed in claim 1, wherein the image communication data format is Motion Picture Experts' Group-4 (MPEG4).

4. The image communication portable terminal as claimed in claim 1, wherein the image communication data format is H.263.

5. A method for carrying out image communication using an image communication portable terminal, the method comprising the steps of:
receiving a data combination requirement during image communication;
reading specific image data to be combined from among image data stored in advance when the data combination requirement is input; and
performing the image communication by continuously combining the read image data current video data currently received from an image capture device during the image communication to create combined data, and continuously encoding and transmitting the continuously combined data as an image,
wherein combining the read image data with current video data includes overlaying the read image data onto the current video data to create the combined data, and
wherein the combined data is encoded and transmitted during the image communication with a recipient portable terminal in real time.

6. The method as claimed in claim 5, wherein the image communication data format is Motion Picture Experts' Group-4 (MPEG4).

7. The method as claimed in claim 5, wherein the image communication data format is H.263.

* * * * *